United States Patent [19]
Gordon et al.

[11] 3,740,929
[45] June 26, 1973

[54] APPARATUS FOR COLLECTING FINELY DIVIDED STICKY MATERIAL

[75] Inventors: Mack Gordon, Medina; John F. Phillippi, Mentor, both of Ohio

[73] Assignee: Aerodyne Development Corporation, Cleveland, Ohio

[22] Filed: June 14, 1971

[21] Appl. No.: 152,858

[52] U.S. Cl............. 55/261, 55/431, 55/454, 55/457, 55/468, 209/144
[51] Int. Cl............................................ B01d 45/12
[58] Field of Search ...........55/261–263, 454, 431, 456, 457, 468; 209/144, 211

[56] References Cited
UNITED STATES PATENTS

| | | | |
|---|---|---|---|
| 2,846,024 | 8/1958 | Bremi | 55/454 |
| 3,199,270 | 8/1965 | Oehlrich | 55/456 |
| 3,477,569 | 11/1969 | Klein et al. | 209/144 |
| 3,535,850 | 10/1970 | Von Ohain et al. | 55/457 |

*Primary Examiner*—Bernard Nozick
*Attorney*—Baldwin, Egan, Walling & Fetzer

[57] ABSTRACT

A modification of apparatus for separating fine particles from a gaseous fluid to provide means for classifying the fine particles is presented. The apparatus for separating particles from fluid is related to that disclosed and claimed in U.S. Pat. No. 3,199,268, granted Aug. 10, 1965 to Karl-Heinz Oehlrich et al. This prior invention involves a primary flow of particles entrained in a fluid medium generally axially of a cylindrical processing chamber from an inlet duct near one end to an outlet duct at the other end. A solid ground closes a portion of the chamber near the inlet duct save for an annular open space next to the wall of the chamber. A secondary circulatory flow is imparted to the fluid medium above the solid ground which causes the solid particles to be separated from the medium and to fall through the annular space into a collecting hopper. The modification of this invention does away with the collecting hopper and uses the bottom end wall of the processing chamber as a solid ground, and the inlet duct is extended above the bottom end wall to form a collecting chamber for the solid particles separated from the fluid medium in the processing chamber. A discharge duct for these solid particles leads tangentially out of the collecting chamber.

1 Claim, 2 Drawing Figures

APPARATUS FOR COLLECTING FINELY DIVIDED STICKY MATERIAL

An object of the present invention is to provide an apparatus for the collection of finely divided sticky solids by the modification of a previously known apparatus for separating fine particles from a fluid medium. This prior device is illustrated in U.S. Pat. No. 3,199,268, granted Aug. 10, 1965 to Karl-Heinz Oehlrich et al. for Particle-From-Gas Separators. This prior patented device passes a fluid medium containing finely divided particles through a generally cylindrical processing chamber from an inlet duct to an outlet duct. This prior patented structure provides a circulatory flow along the walls of the processing chamber toward the inlet end thereof, preferably by the introduction of one or more jets of a second medium supply introduced tangentially of the walls of the processing chamber and inclined downwardly toward the inlet end of the processing chamber. On the inlet duct, there is provided a solid ground which extends radially outwardly from the duct to a zone spaced from the walls of the processing chamber and leaving an open annular passageway at that point. The particles separated from the fluid medium fall downwardly through this open annular space into a receiving hopper beneath and the fluid medium exists through the outlet duct.

The present invention does away with the hoppper because the separated finely divided sticky solids would fall into the hopper and become one large lump. Instead, the solid ground of the above mentioned patent is moved to the bottom end wall of the processing chamber and the inlet duct extends axially of the processing chamber to a height sufficient to provide a collecting chamber on the bottom wall around the inlet duct. The solids in the collecting chamber are caused to discharge through a duct which leads tangentially away from the collecting chamber in the same direction as the circulatory flow along the walls of the processing chamber.

Other objects and advantages of the present invention will be apparent from the accompanying drawings and description and the essential features thereof will be set forth in the appended claims.

In the drawings,

FIG. 1 is a side elevational view of apparatus involving this invention; while

Figure 1:
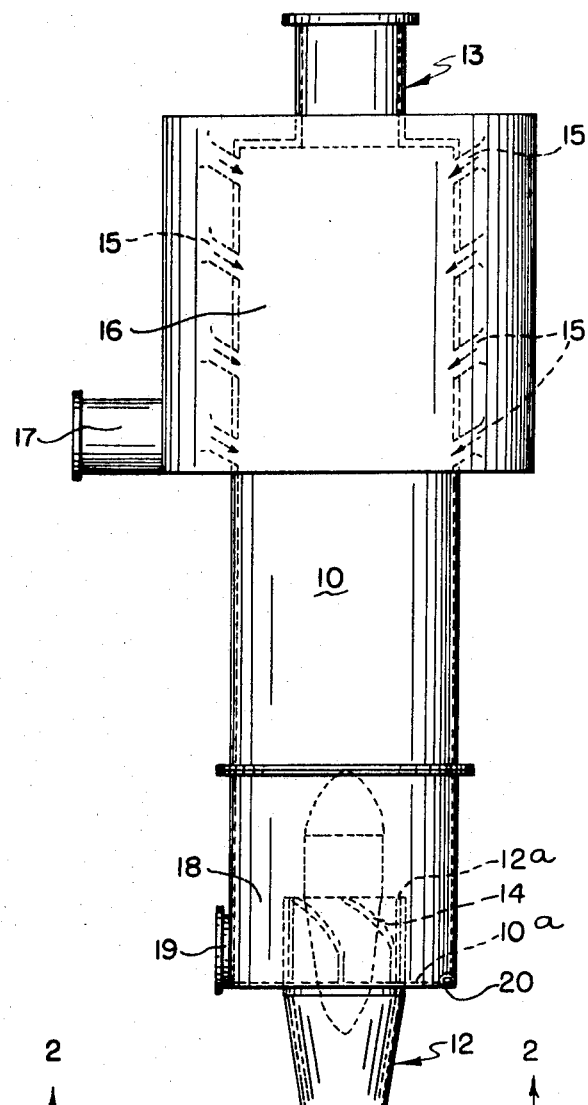

To fully understand the basic apparatus which is modified by the present invention, reference may be had to U.S. Pat. No. 3,199,268, granted Aug. 10, 1965 to Karl-Heinz Oehlrich et al. which is incorporated herein by reference. It will be sufficient to state here that this prior patent includes a processing chamber 10 having rotationally symmetrical side walls, such as a cylindrical form which is represented herein in the drawings. While this apparatus is shown herein as standing in a vertical position, it should be understood that the same apparatus may be positioned horizontally or otherwise as desired. Near the lower end of the processing chamber 10 there is fixed an inlet duct 12 for the introduction of a gaseous medium containing finely divided particles. At the upper end of theprocessing chamber is an outlet duct 13 which is either coaxial with, or on a parallel axis with, the upper end of the inlet duct 12. The flow between the duct 12 and the duct 13 is herein referred to as a primary flow along an axis passing through the ducts 12 and 13. Agitating means may be provided for imparting to the primary flow a circulatory direction. Such means comprises stationary vanes 14 fixed at the discharge end of the inlet duct, all of these vanes inclined upwardly and outwardly and in the same clock direction.

A second agitating means imposes a second circulatory flow on said primary flow causing the solid particles in the primary flow to move toward the cylindrical side wall 10. This second means comprises a plurality of jet openings 15 in communication with a manifold 16 into which a second gaseous medium is introduced at 17. The jet openings 15 introduce gaseous jets at a higher energy level than the primary flow in the processing chamber 11 tangentially of the walls 10 and inclined downwardly toward the inlet end of the processing chamber.

As explained in the previously mentioned patent, the construction is such that the finely divided solid particles move on the periphery near the side walls of chamber 10 on a helical line downwardly in the processing chamber but, when they reach a solid ground, which in this prior patent is above the bottom wall of the processing chamber, the fluid motion converts to an approximately logarithmic spiral along which the solid particles reach the center of the processing chamber where they rise in a vortex filament near the primary flow axis. At a certain height, inversely proportional to the square root of the angular velocity of the fluid medium, a spatial vortex source forms itself. There, the particles are flung outwardly until they reach the downwardly directed agitating circulatory secondary flow caused by the jets 15.

Figure 2:
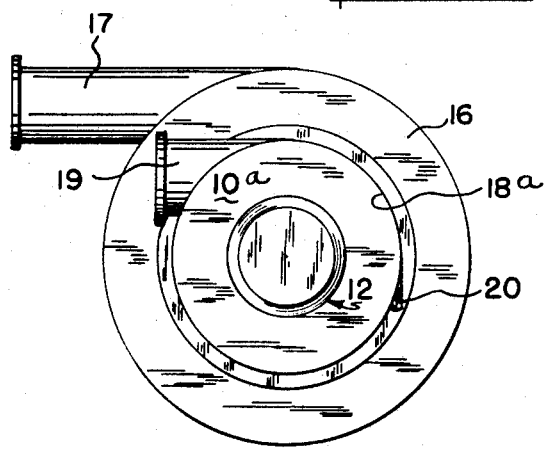
FIG. 2 is a bottom plan view of the same taken from the position of line 2—2 of FIG. 1.

To carry out the purposes of the present invention, the solid ground of the earlier invention has been moved down to the bottom end wall 10a of the processing chamber 10. The inlet duct 12 is extended coaxially of the processing chamber 10 to a zone 12a at a predetermined height above the bottom wall 10a sufficient to provide a collecting chamber 18 in the annular space surrounding the inlet duct and between the levels of the bottom 10a and of the upper end of the inlet duct 12a. A discharge duct for the collected solid particles leads peripherally out of the collection chamber 18 as seen in FIG. 2 tangentially and extending in the same direction as the circulatory secondary flow caused by the agitating jets 15. It results from this construction that when finely divided sticky solid particles, in one embodiment cheese particles ranging in size from 1 or 2 microns to about 50 microns, carried in a stream of hot air as from a dryer, the solid particles are separated from the hot air stream in the processing chamber 10 and the separated solid particles travel down the walls of the chamber 10 into the collecting chamber 18. There is then a sufficient low pressure in the collecting chamber 18 to cause the solid particles there to travel out the discharge duct 19. Meanwhile, the air stream minus the solid particles passes out the outlet duct 13.

To aid in keeping the solid particles moving out of the collecting chamber 18 through the duct 19, one may provide one or more gaseous jets as at 20 under light pressure and directed in such a way as to aid the solid particles to move toward the discharge duct 19. Preferably, the jet 20 is tangential to the outer wall of the collecting chamber so that the jet stream will travel directly around the curving wall portion 18a of the collecting chamber directly into the discharge duct 19, as clearly seen in FIG. 2. The pressure at the jet 20 is preferably between about 0.1 to 10.0 inches water gauge.

In a small capacity embodiment of this invention, the processing chamber 10 is about 4 inches in diameter and about 10 inches long up to the manifold 16 which in turn is about 6 inches in vertical height. Such a smaller device uses as jet 20 a pipe of about one-fourth inch to three-eights inch inside diameter. Of course, larger models would use larger dimensions.

An essential element of this invention is that the finely divided sticky particles are kept moving at all times because if they were collected in a hopper at the bottom of the processing chamber, they would merely form into a large lump because the particles would stick together. Utilizing this invention, the particles are separated from the hot air stream from the dryer and delivered in usable form at the discharge duct 19.

What is claimed is:

1. In apparatus for collecting finely divided solid sticky particles entrained in a hot gaseous medium, comprising an elongated processing chamber having rotationally symmetrical side walls and having an axially positioned inlet duct near one end wall for the introduction of finely divided solid sticky particles entrained in a gaseous medium and said chamber having an outlet duct near its other end, said two ducts being coaxial and defining together a primary flow axis, said inlet duct including a generally cylindrical coaxial wall extending inwardly of said chamber to a zone at a predetermined distance from said one end wall, stationary vanes at the discharge end of said inlet duct inclined upwardly and outwardly all in the same direction and causing said primary flow, agitating means for imparting to the primary flow of the medium in said chamber a circulatory secondary flow causing said solid particles to move through said chamber toward said inlet end adjacent said side walls, said one end wall forming a solid ground at an intermediate portion of the length of said inlet duct and extending radially outwardly therefrom to said side walls, the walls of said chamber up to said zone and including said one end wall providing a collection chamber for said solid particles between said one end wall and said zone of predetermined extent, the arrangement of said stationary means and said agitating means being such as to form in said processing chamber a vortex sink near said solid ground and a vortex source remote from said inlet duct toward said outlet duct, and a discharge duct for solid particles collected in said collection chamber, said discharge duct leading tangentially away from the peripheral edge of said collection chamber in the same direction as said circulating secondary flow caused by said agitating means, and low pressure gaseous jet means in said collection chamber positioned tangentially at the peripheral edge of said collection chamber and directed toward said discharge duct and keeping said finely divided sticky particles continuously moving while aiding the movement of said solid particles toward said discharge duct.

* * * * *